UNITED STATES PATENT OFFICE.

WILHELM BORCHERS, OF AIX-LA-CHAPELLE, GERMANY.

PROCESS OF TREATING TITANIFEROUS IRON ORES.

No. 930,344.        Specification of Letters Patent.        Patented Aug. 10, 1909.

Application filed November 24, 1908. Serial No. 464,256.

*To all whom it may concern:*

Be it known that I, WILHELM BORCHERS, rector of the Royal Polytechnicum at Aix-la-Chapelle, Germany, a subject of the King of Prussia, residing at No. 15 Ludwigsallee, Aix-la-Chapelle, in the Kingdom of Prussia, Empire of Germany, have invented certain new and useful Improvements in Processes of Treating Titaniferous Iron Ores; and I do hereby declare the following to be a full, clear, and exact description of the invention, such as will enable others skilled in the art to which it appertains to make and use the same.

My present invention relates to a process of treating titaniferous iron ores and the object in view is to produce an iron free from titanium, titanium combinations or titanium alloys containing but very little silicium, and a slag useful for metallurgical reducing purposes.

Leaving out of consideration the first putting into operation of the plant, the reduction of the iron ores is according to my present invention accomplished indirectly, by reducing a sufficient part of the slag obtained during the regular operations without a previous cooling off to a deoxydizing agent consisting of iron, titanium and carbon by increasing the temperature of said slag and introducing carbon into the latter. This deoxydizing agent is then added in such limited quantities to the ores at temperatures not very much surpassing 2000° C. that the greater part of the ferric oxids together with the silicic acid of the ore or of a magnetically obtained concentrate of the ore is reduced, whereas a smaller part of the ferric oxids forms a slag with the entire bulk of the titanic acid. Of this slag a sufficient quantity is retained for the succeeding operations to act as an energy transferring agent, in which capacity it is employed for reducing purposes as indicated above.

Trials to reduce titaniferous iron ores in an electric furnace by means of an incomplete reduction to iron free from titanium, and to a slag which contains the titanium have been frequently made, but no attempts were made to separate the titanium from silicium.

The object of my present invention is now, not only to separate the titanium from iron, but also from silicium, through which process the utilization of the titanium slag as a valuable energy transferring agent for the reduction of ores and for other metallurgical purposes is made possible.

The working operation of my new process is characterized by the following features:— On putting the plant for the first time into operation, titaniferous iron ore or its natural product of comminution, namely titaniferous iron sand, is put into a suitable electric furnace and carbon is added, whereupon the contents of the furnace are smelted. Later on, when the plant is in its regular working condition a deoxydizing agent, more fully to be described below, is added at a temperature lying near but not much above 2000° C., in quantities sufficient to extract the main bulk of the iron and all of the silicium present. The resulting smelting products are a crude iron which contains practically the whole amount of the silicium of the ores, and a slag which contains a small part of iron but very much titanic acid. For the success of this operation it is necessary, however, that the quantity of silicic acid ($SiO_2$) of the ore is not as large as in the poorer kinds of titaniferous iron sands, of which it sometimes forms 20% and more. In such cases a magnetic dressing of the ore would easily and without great expenses produce concentrates with but very few per cents. (1.5 to 3%) of silica ($SiO_2$), which can be easily reduced according to the present process. For complete separation of the titanic acid by means of this smelting operation the quantity of the deoxydizing agent must be so chosen, that with every 10 to 15 parts by weight of the titanium present one part by weight of iron will go into the slag.

Contrary to other heretofore known processes lime or other fluxes should not be used in the present process, since their employment would raise the costs of smelting and diminish the possibility of utilizing the slag.

After a sufficient quantity of slag has collected—eventually after repeated tapping of the crude iron which contains the reduced silicium—so that the necessary steps can be taken to put the slag to its proper use, the slag will be electrically heated either in the same furnace after the crude iron has been drawn off, or in another furnace to a higher temperature, hitherto not ascertained with certainty, but estimated to exceed 2500° C. Then carbon in shape of coke, charcoal and the like is added in a preferably heated condition and the slag is now reduced to a product which principally consists of iron, titanium and carbon, which product must be considered as a mixture of carbids, titanids and variable amounts of free titanium. This mixture forms an energetic reducing agent, which is employed as such for reducing the titaniferous ore, in the place of coal or coke hitherto used for this purpose. The heat set free during the reaction of this mixture upon the iron-ore aids the smelting process not only as far as speed is concerned, but also as far as certainty of the desired result of the smelting operation comes under consideration. The regular working operation of the present process therefore consists therein, that only the slag is directly reduced by means of carbon, whereas the ore is reduced by means of the product of this reduction, which consists of iron, titanium and carbon.

It is evident, that the quantity of slag is increased with each new charge of iron ores, and that finally for the execution of the process only such a part of the slag need be smelted with carbon as is required for the reduction of the subsequent charge of ore. The other part of the slag can of course be reduced too, as far as the product of the reduction can be employed as an agent to accomplish reducing, refining and alloying operations. This secondary process does, however, not form a part of the above described process and is therefore not claimed in the appended claims. Also the further treatment and utilization of the crude iron which contains the silicium may be accomplished according to known methods.

The characteristics of the present invention therefore reside in the following facts:—
1. Reducing iron ores rich in titanium to crude iron which contains silicium and is free from titanium, and a slag poor in silicium and rich in titanium. 2. Transforming this slag without a previous cooling off through a comparatively little increase in temperature by means of carbon into a highly reactive reducing agent. 3. Utilization of the reducing agent obtained according to point 2 for the purpose of reducing the ore according to point 1 as much as this process demands, and utilization of an eventual over-production of such reducing agent for other metallurgical operations. 4. Utilization of the crude iron according to known methods for the manufacture of other kinds of iron, steel and alloys.

The present process characterizes itself as an indirect reduction of iron ores containing much titanium in such a manner that the slag is reduced by carbon and the reducing agent obtained thereby is used in the first place for the reduction of the iron ores. The advantages of this process may be enumerated under the following heads:—1. Winning a crude iron which contains silicium and is free from titanium and which is utilizable for the most purposes of the iron industry. 2. Winning of a slag poor in silicate and rich in titanium which slag permits:—3. The utilization of its heat when by an increase in its temperature and an addition of carbon it is reduced to a reducing agent, whose heat of reaction accelerates and perfects the smelting of the ore considerably and which also may be utilized for other reducing, refining and alloying purposes. 4. Lime stone or any other slag forming fluxes are made superfluous. 5. The recovery of the iron is practically perfect, since the iron which first serves for the scorification of the titanium enters into the reducing agent obtained from the slag and passes with the reducing agent into the crude iron or into any other product.

I claim:—

1. The process of treating titaniferous iron-ores, consisting in initially smelting said iron-ores in presence of carbon directly, drawing off the crude iron, reducing the slag produced during the smelting operation by carbon to a reducing agent, and utilizing said reducing agent for reducing subsequent charges of titaniferous iron ores.

2. The process of treating titaniferous iron-ores, consisting in initially smelting said iron ores in presence of carbon directly, drawing off the crude iron, reducing the slag produced during the smelting operation to a reducing agent by raising its temperature and adding carbon, and utilizing said reducing agent for reducing subsequent charges of titaniferous iron-ores.

3. The process of treating titaniferous iron ores, consisting in initially smelting said iron ores in presence of carbon, drawing off the crude iron containing silicium, heating the slag produced during the smelting operation and adding thereto carbon for transforming said slag into a reducing agent, and utilizing said reducing agent instead of coal or coke for reducing subsequent charges of titaniferous iron ores.

4. The process of treating titaniferous iron ores, consisting in initially smelting said iron ores in presence of carbon directly, tapping off the crude iron, reducing the slag produced during the smelting operation by increasing its temperature and adding carbon, to a reducing agent mainly consisting of iron, titanium, and carbon, and utilizing said reducing agent for reducing subsequent charges of titaniferous iron ores to iron free from titanium and rich in silicium and to a slag rich in titanium and poor in silicium.

5. The process of treating titaniferous iron ores consisting in initially smelting said iron ores in presence of carbon directly, tapping off the crude iron, reducing the slag produced during the smelting operation by increasing its temperature and adding thereto heated carbon, to a reducing agent, and mixing said reducing agent at temperatures not much higher than 2000° C. with subsequent charges of titaniferous iron ores for reducing the latter to iron free from titanium and rich in silicium and a slag rich in titanium and poor in silicium.

6. The process of treating titaniferous iron ores, consisting in initially smelting said iron ores in presence of carbon directly, tapping off the crude iron, reducing the slag produced during the smelting operation by increasing its temperature and adding thereto carbon in a heated condition, to a reducing agent consisting of iron, titanium and carbon, mixing said reducing agent at a temperature not much higher than 2000° C. in such limited quantities with new charges of titaniferous iron ores as to reduce the greater part of the iron oxids together with the silicic acid and transform a smaller part of said iron oxids into a slag containing all of the titanic acid, and retaining a part of said slag as an energy transferring agent for subsequent reducing operations.

In testimony whereof I have signed my name to this specification in the presence of two subscribing witnesses.

WILHELM BORCHERS.

Witnesses:
HENRY QUADFLIEG,
ELISE KALBUSCH.